Dec. 15, 1925.
F. L. JOHNSON
COLLAPSIBLE TIRE CORE
Filed July 28, 1920
1,566,014
2 Sheets-Sheet 1
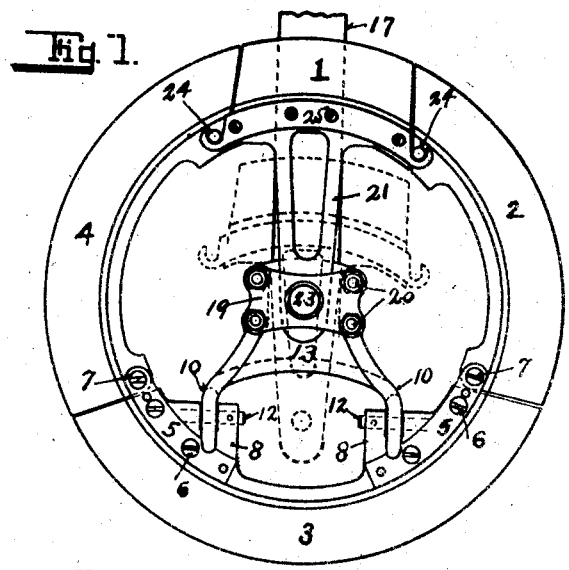
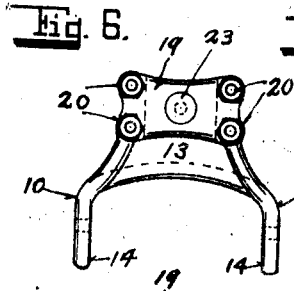
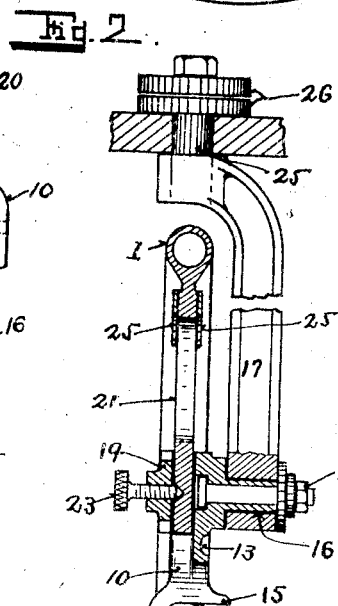
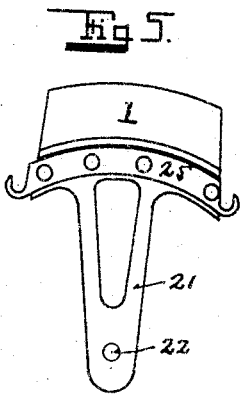
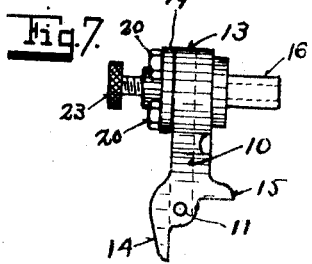
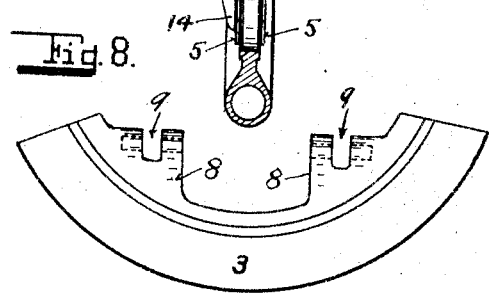
Inventor.
Frank L. Johnson
By J.C.H.McSimpson
Attys Dec. 15, 1925.

F. L. JOHNSON

COLLAPSIBLE TIRE CORE

Filed July 28, 1920

Inventor
Frank L. Johnson

Patented Dec. 15, 1925.

1,566,014

UNITED STATES PATENT OFFICE.

FRANK L. JOHNSON, OF AKRON, OHIO.

COLLAPSIBLE-TIRE CORE.

Application filed July 28, 1920. Serial No. 399,493.

*To all whom it may concern:*

Be it known that I, FRANK L. JOHNSON, a citizen of the United States, residing at Akron, in the county of Summit and State of Ohio, have invented certain new and useful Improvements in Collapsible-Tire Cores; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to tire building cores and mechanism to collapse the same after the tire has been built thereon. The principal feature of the invention is the mounting of a plurality of hinged sections as a group, which group is movable as a unit to a position out of the original core plane. In the form of the invention shown and described herein, this result is obtained by mounting the group of sections upon a pivot about which the group may be moved to a plane which is at an angle to the original plane of the core. In any forms of the invention, the core may be collapsed quickly and easily and without the use of complicated mechanisms.

Other features of my invention will appear hereinafter and are fully described and pointed out in the specification and claims, and are illustrated in the accompanying drawings in which:

Figure 1, is a front elevation of my improved collapsible tire building core and the supporting mechanism therefor.

Figure 2, is a vertical central section thereof.

Figure 5, is a side elevation of the key section of my improved tire building core.

Figure 6, is a front elevation of the supporting bracket thereof.

Figure 7, is a side elevation of Fig. 6.

Figure 8, is a plan view of one of the sections of my improved tire building core.

Figure 3:
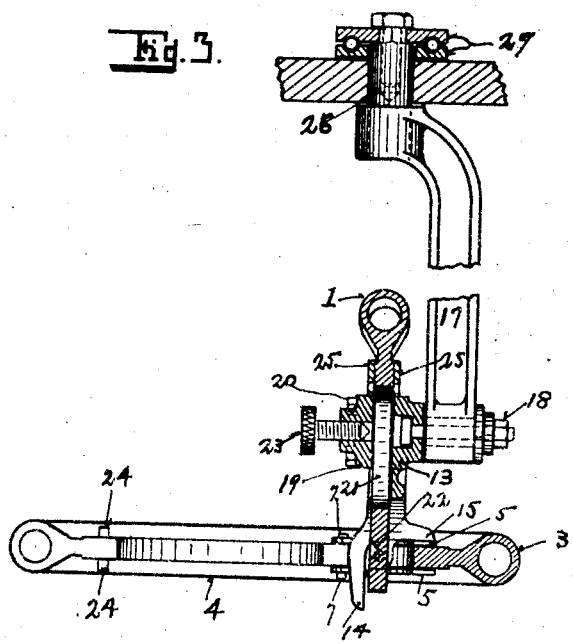
Figure 3, is a like view of the same partially collapsed.

In these drawings the numerals 1, 2, 3 and 4, indicate the several sections of my tire building core. Upon opposite sides of the section 3 are secured straps 5—5 by means of screws 6, the ends of which project beyond the ends of the core section 3.

The core sections 2 and 4 are hinged to the ends of the straps 5 by means of screws or bolts 7 so that they will swing inwardly within their own planes.

The section 2 swings inwardly past section 4, and the section 4 swings inwardly behind section 2, after the key section 1 has been moved inwardly as shown by broken lines in Fig. 1, and after the group has been moved to its new position in the different planes.

Section 3 is provided with inwardly projecting hinged lugs 8, having slots 9—9 (see Fig. 8) in which the arms 10 (see Fig. 6) of the supporting bracket are inserted. The arms 10 of the supporting bracket are provided with holes 11 (see Fig. 7) which coincide with holes in the hinged lugs 8 (see broken lines in Fig. 8) in which hinge pins 12 (see Fig. 1) are inserted; said pins passing through the holes 11 in the bracket arms 10, thereby pivotally securing the bracket 13 (see Fig. 6) to section 3 of the core. The bracket arms 10 are provided with extensions 14, which engage the front surfaces of the straps 5—5 on the core section 3 and thereby prevent the core from being swung upwardly past a perpendicular position. The bracket arms 10 are also provided with horizontal extensions 15 (see Figs. 2, 3 and 7) which limit the forward and downward movement of the group of core sections as shown in Fig. 3.

The bracket 13 is provided with an axle journal 16 which is mounted in a supporting bracket 17 (see Figs. 2 and 3) and therein secured by means of a nut 18. Secured on the front of the bracket 13 is a plate 19 by means of bolts 20; said plate 19 being spaced away from the web of the bracket 13 so that the inwardly projecting arm 21 on the key section 1 of the core may be slidably inserted between the plate 19 and the bracket web 13. The arm 21 of the section 1 of the core is provided with a conical indentation 22 adapted to receive the inner end of the thumb screw 23 by means of which thumb screw and indentation 22 the key section 1 of the core is maintained in the position thereof shown by full lines in Fig. 1.

The core sections 2 and 4 are each provided on their opposite sides with projecting studs 24 which are adapted to be engaged by the hooked ends of the side straps 25 secured on opposite sides of the key section 1, the said hooked ends thereof overlapping the ends of the core sections 2 and 4 so that when the core is in the position thereof shown by full lines in Fig. 1, said hooks will engage the studs 24 on the core sections 2 and 4, in which position the key section is maintained by the thumb screw 23, and the core with its supporting bracket 13 is free to revolve upon the journal 16.

In the drawings I have shown a convenient means of supporting the core from above by means of the bracket 17 pivoted upon the overhead support by means of the journal 26, and anti-friction bearing 27. This manner of supporting the bracket, however, can be dispensed with and other means used if desired, without departing from the scope of my invention. In operation when it is desired to collapse the core into the position thereof shown in Fig. 4, the thumb screw 23 is turned backward until the key section 1 can be moved inwardly, in the drawings downwardly, as shown by broken lines in Fig. 1, and full lines in Fig. 3, the arm 21 of the key section sliding freely between the plate 19 and the bracket 13. The remaining sections of the tire core can then be swung forwardly on the hinged pins 12 until such movement is stopped by the rearwardly projecting shoulder 15 on the bracket arms 10, the key section 1, meanwhile remaining in the position thereof shown in Fig. 3.

Figure 4:
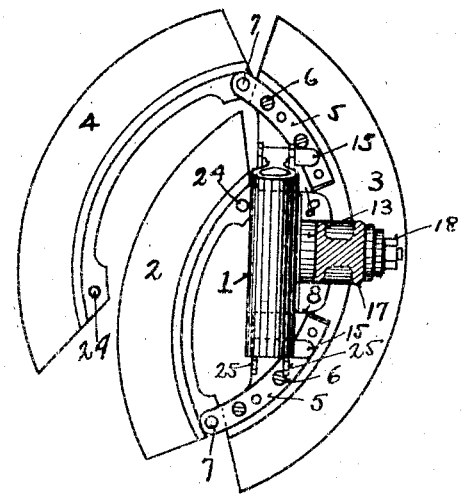
Figure 4, is a plan view of the same completely collapsed.

After the sections 2, 3, and 4 of the core are in the position thereof shown in Fig. 3, sections 2 and 4 of the core can be swung inwardly, as shown in Fig. 4. It will be obvious to those skilled in the art that with my improved tire building core and the supporting mechanism therefor, as herein shown, described and illustrated, it will be comparatively easy to remove a completed tire casing therefrom. Therefore having shown and described my invention so that others can utilize the same, I do not desire to be limited to the exact mechanism shown and described, as many changes and alterations can be made therein without departing from the scope of my invention; therefore what I claim as new and desire to secure by Letters Patent is:

1. In a tire building apparatus, a core section, hinge-lugs thereon within the plane thereof, a bracket pivoted to said hinge-lugs, a supporting journal on said bracket at the axis of said core section and in line therewith, means to limit the swing of said core section on said hinge pivot, a core section hinged to each end of said first mentioned core section, oppositely projecting studs adjacent to the free ends of said last mentioned core sections, a key section, an arm rigidly secured to said key section and slidably mounted in said bracket, means on said key section adapted to overlap the free ends of the adjacent core sections and detachably engage the oppositely extending studs thereon, and means to maintain said key section in its extended position.

2. In a tire building apparatus, a collapsible tire core composed of a plurality of articulate core sections, and a key section, a supporting bracket hinged to one of said articulate core sections within the plane thereof, a journal on said supporting bracket at the axis of said core sections for rotatably supporting said bracket and core sections and a rigid radial arm on said key section slidably mounted in said bracket, the articulated core sections being movable as a group on the bracket to a plane at right angles to the key section.

3. In a tire building apparatus, a bracket rotatably mounted upon a suitable support, downwardly extending arms on said bracket, a key core section slidably supported on said bracket in a plane at right angles to the axis of rotation of said bracket, a core section pivoted to said downwardly extending bracket arms, means on said bracket arms to limit the swing of said core section thereon, hinged straps secured on opposite sides of said core section adjacent to each end thereof and extending beyond the ends thereof, core sections hinged to said hinge straps, oppositely extending studs adjacent to the free ends of said last mentioned core sections, a key core section, straps secured on opposite sides thereof and terminating in hooks which overlap the ends of the adjacent core sections and are adapted to embrace the studs thereon, a radial arm on said key section and slidably mounted in said bracket, and means mounted in said bracket adapted to engage said arm to maintain said key core section in engagement with said adjacent core sections.

4. A collapsible core comprising a plurality of sections hinged together end to end, and a movable support for said sections on which they may be moved to a position outside of the original core plane.

5. A collapsible core comprising a plurality of sections, certain of said sections being hinged together end to end, and a pivoted support for said sections with which they are movable as a group.

6. A collapsible core comprising a plurality of sections, one of said sections being movable toward and from its position in the complete core, and a support for the remaining sections by which they may be moved as a group to a different plane.

7. A collapsible core comprising a plurality of sections, one of said sections being a key section and being movable toward and from the axis of the core, the remaining sections being hinged together, and a movable support for the remaining sections by which they may be moved as a group.

8. In a collapsible core construction, a core body composed of a plurality of sections, one of said sections being tapered outwardly of the core, means to support the core in a vertical plane, the tapered section being movable toward and from the center of the core, and a horizontal pivot for the remaining sections whereby they may be rocked as a group out of the plane of the first named section.

9. In a collapsible core construction, a core body composed of a plurality of sections, one of said sections being movable relatively to the other sections, the remaining sections being connected together in a group, and a support for the group of sections on which it may be moved so as to shift the group into a plane out of the original core plane.

10. In a collapsible core construction, a core body composed of a plurality of sections, one of said sections being movable toward and from its position within the completed core, and a support for the remaining sections, said support being movably mounted to shift the remaining sections as a unit out of the original core plane.

11. In a collapsible core composed of a plurality of abutting sections, a key section mounted for movement in a vertical plane and articulated sections mounted for revoluble movement from a position within said plane to a horizontal plane.

12. A collapsible core including rotatable bracket, a key section movable in a plane of rotation and a plurality of articulated sections hinged to said bracket for movement on an axis disposed at a right angle to the axis of rotation.

13. A core composed of a plurality of sections one of said sections being a key section, the other sections being hinged in end to end relation for movement in a common plane, means to slidably support said key section for movement in its own plane and means to hingedly support said hinged sections for movement to and from the plane of said key section.

14. A collapsible core including a rotatable bracket, a key section slidably mounted therein for movement radially thereof, a plurality of sections hingedly connected for movement in a common plane and means to hingedly connect said sections to said bracket for movement as a whole to and from the plane of said key section.

15. In a collapsible core, a rotatably mounted bracket, a key section mounted therein for movement within the plane of rotation, a plurality of articulated sections connected to said bracket so as to be movable as a whole on an axis disposed at a right angle to the axis of rotation.

16. In a collapsible core a rotatably mounted bracket, a key section slidably mounted therein for movement radially thereof, a plurality of sections hinged together for movement in a common plane; one of the last named sections hingedly connected to said bracket for movement on an axis disposed at a right angle to the axis of rotation.

17. In a collapsible core, a plurality of sections adapted to abut in the form of an annulus, a support, a bracket rotatably mounted on said support, a key section slidably mounted on said bracket for movement within the plane of rotation, the other sections being hinged together and having one section hinged to said bracket for movement to and from the plane of rotation.

18. In a collapsible core, a supporting member mounted for rotation on a fixed axis, a bracket rotatably mounted thereon for rotation in the plane intersecting said axis, a plurality of core sections carried by said bracket, said core sections adapted when positioned in end to end abutment to form a tire building form, one of said sections being a key section slidably secured to said bracket for movement radially thereof; hinges connecting the other sections in end to end relation, the axes of said hinges being disposed transversely of the sections; one of said hinged sections hinged to said bracket on an axis disposed at a right angle to its axis of rotation.

19. In a collapsible core construction, a supporting plate, a core body composed of a plurality of sections, means to slidably support a section of the core on the plate, and means to pivotally support the remaining sections thereon.

20. In a collapsible core construction, a supporting plate, a core body composed of a plurality of sections, means to slidably support a section of the core on the plate, and means to pivotally support the remaining sections as a group thereon.

21. In a collapsible core construction, a supporting plate, a guide on said supporting plate, a core body composed of a plurality of sections, one of said sections being slidably supported in the guide, and a pivotal support on the plate for one of the remaining sections, the balance of the core sections being pivoted to the last mentioned section.

22. In a collapsible core construction, a core body composed of a plurality of sections, one of said sections being slidably mounted for movement toward and from the center of the core, a second core section mounted on a pivot parallel to the plane of the core at a position opposite to the first named section, and a third core section pivoted to the end of the second section.

23. In a collapsible core construction, a core body composed of a plurality of sections, one of said sections being a key section, means to support and guide the key section for movement in a straight line toward and from its position in the core, a second section opposite the key section, a pivotal support for the second section, and a third section between the aforementioned sections and pivotally connected to one of them.

24. In a collapsible core construction, a core body composed of a plurality of sections, one of said sections being a key section, means to support and guide the key section for movement toward and from the center of the core, a second section opposite the key section, a pivotal mounting for the second section, and intermediate sections pivoted to the end of the second named section.

25. In a collapsible core construction, a core body composed of a plurality of sections, one of said sections being a key section which is movable toward and from the axis of the core, the remaining sections of the core being hinged together end to end as a group, and a pivot for said group of sections located at one side of the axis of the core and upon which the group of sections may be moved to a position outside of the original core plane.

In testimony whereof I affix my signature.

FRANK L. JOHNSON.